UNITED STATES PATENT OFFICE.

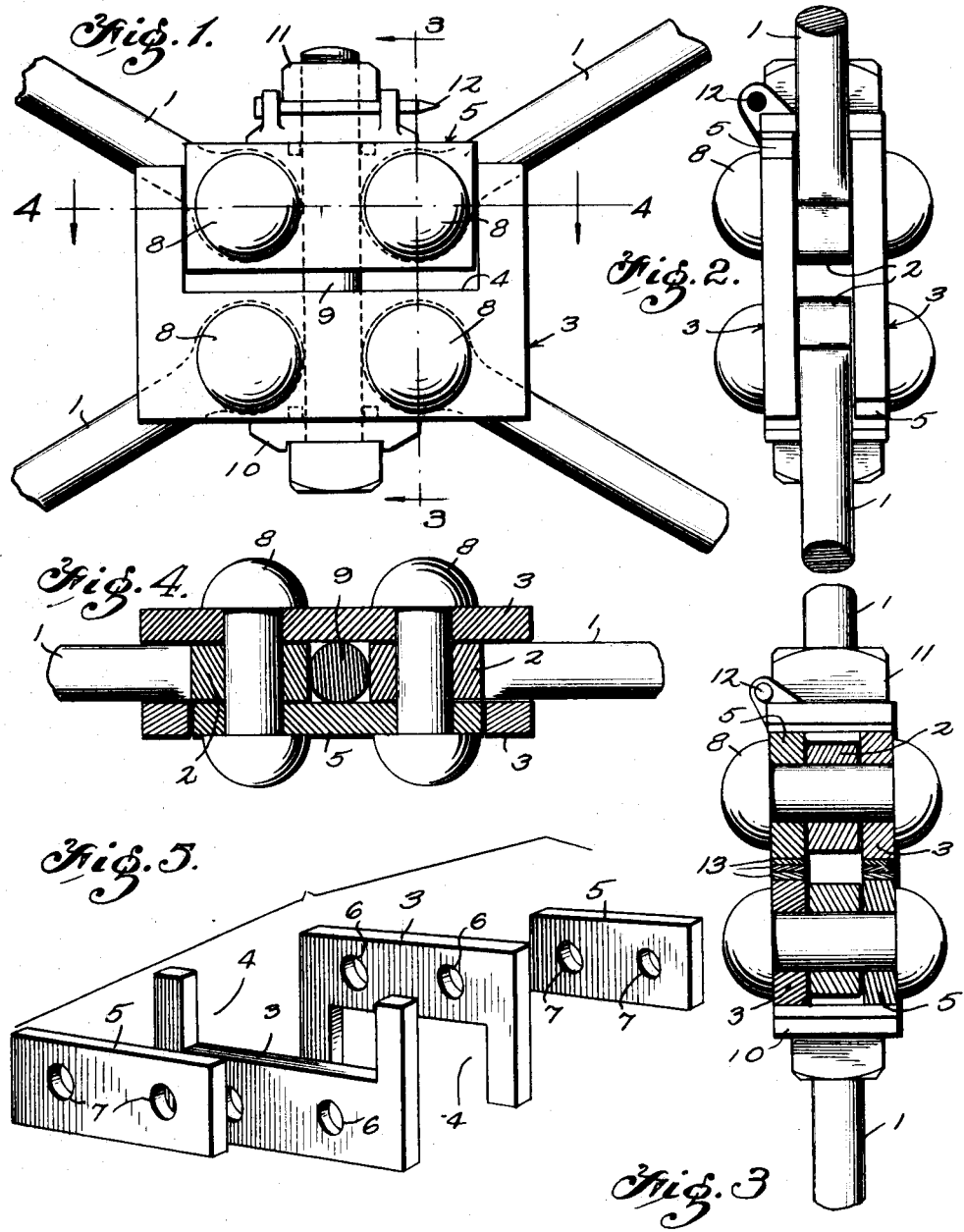

RICHARD RALPH BLOSS AND WILLIAM SCHWEMLEIN, OF PARKERSBURG, WEST VIRGINIA, ASSIGNORS TO THE PARKERSBURG RIG & REEL COMPANY, OF PARKERSBURG, WEST VIRGINIA, A CORPORATION OF WEST VIRGINIA.

FITTING FOR DIAGONAL BRACES.

1,388,162.        Specification of Letters Patent.        Patented Aug. 23, 1921.

Application filed January 20, 1921. Serial No. 438,721.

*To all whom it may concern:*

Be it known that we, RICHARD R. BLOSS and WILLIAM SCHWEMLEIN, citizens of the United States, residing at Parkersburg, in the county of Wood and State of West Virginia, have invented certain new and useful Improvements in Fittings for Diagonal Braces, of which the following is a specification.

This invention relates to adjustable fittings for diagonal bracing members, and it comprises a connection for joining the diagonal braces of a derrick, tower, or similar structure, in the vertical plane at the point of intersection to provide means for a limited adjustment to retain the braces under tension.

The invention comprises a pair of plates arranged on opposite sides of the ends of the braces, each of said plates being provided with recesses. A second plate is arranged in each of the recesses, the second plate being disposed opposite the body portion of the first mentioned plate, said plates being provided with openings for the reception of rivets adapted to receive the ends of the braces. A bolt is arranged between the top and bottom of the plates, having a nut on one end whereby the plates may be drawn together to tighten the braces, by tightening said nut.

In the present invention, we have provided an adjustable fitting for diagonal braces, whereby the two diagonal braces arranged in a bay or section of a sectional derrick or tower may be uniformly tightened. By uniformly tightening the braces and maintaining the upper and lower sections in a straight line between the upper and lower points of attachment to the derrick fittings any couple or turning moment, tending to rotate the fastening member is eliminated thus preventing excessive weaving and distortion under the action of lateral forces due to wind, horizontal components of vertical forces and other sources. By attaching the ends of the diagonal braces to separate elements, instead of attaching them directly to the tension bolt, as in prior constructions, and by providing these separate elements with means to keep them from shifting their relative position in a direction at right angles to the axis of the tension bolt, shearing action on the tension bolt is eliminated and a more efficient construction is provided.

In the accompanying drawings, we have shown one embodiment of the invention. In this showing:

Figure 1 is a side elevation showing the diagonal braces connected to the fitting, Fig. 2 is an end elevation, Fig. 3 is a vertical sectional view on line 3—3 of Fig. 1, Fig. 4 is a horizontal sectional view on line 4—4 of Fig. 1, and, Fig. 5 is a detail view of the fitting disassembled.

Referring to the drawings, the reference numeral 1 designates the ends of four diagonal braces which are secured to the four corners of a section of a derrick, or similar structure, in any suitable manner (not shown). The inner ends of each of the members 1 are provided with eyes 2, whereby they are secured to the fitting. The fitting comprises a pair of plates 3 adapted to be arranged on opposite sides of the ends of the bracing members. Each of these plates is provided with a recess 4. When in assembled position, one of the plates is inverted, whereby the recess is arranged at the bottom, the recess in the other plate being arranged in the top (see Fig. 5). A second pair of plates 5 are provided which are adapted to be arranged in the recesses 4. The plates 3 are provided with openings 6, and the plates 5 are provided with similar openings 7. When assembled, the plate 5 arranged in the recess of one of the plates 3, is so disposed that the openings 7 therein will register with the openings 6 in the opposite plate 3. Rivets, or other fastening means 8 are adapted to be passed through these openings, and through the openings formed in the end of the bracing members. A tension bolt 9 is arranged between the two sets of plates, and this bolt may be prevented from rotating by any type of locking washer 10. The upper end of the bolt is adapted to receive a nut 11, which is prevented from rotating on the bolt, when adjusted, by a locking pin 12.

In the use of the device, the fittings are properly secured to the corners of the bay or section of a derrick, or similar structure, and the inner ends are arranged between the plates 3. The plates 5 are then placed in position and the rivets 8 arranged in the openings 6 and 7, passing through the openings in the eyes 2 formed on the ends of the bracing members. By tightening the nut 11, the ends of the bracing members are uniformly and equally adjusted. Shims or liners 13 may be arranged at the bottom of the recesses 4, contacting with the inner edge of the plates 5.

It is to be understood that the form of our invention herewith shown and described is to be taken as a preferred example of the same, and that various changes in the shape, size, and arrangement of parts may be resorted to without departing from the spirit of the invention or the scope of the subjoined claims.

Having thus described our invention, we claim:

1. A fitting for diagonal bracing members comprising a pair of plates adapted to be arranged on opposite sides of the ends of the bracing members, a second pair of plates adjustably mounted on said first plates, said plates being provided with means whereby the ends of the bracing members may be secured to one of each pair of plates, and fastening means for retaining said second plates in adjusted position on said first plates.

2. A fitting for diagonal bracing members comprising a pair of plates adapted to be arranged on opposite sides of the ends of the bracing members, said plates being provided with recesses, a second pair of plates adjustably mounted in said recesses, means for securing the ends of the braces to one of each pair of plates, and fastening means for retaining said second mentioned plates in said recesses.

3. A fitting for diagonal bracing members comprising a pair of plates adapted to be arranged on opposite sides of the ends of said bracing members, said plates being provided with recesses, and being further provided with openings, a second pair of plates mounted in said recesses and provided with openings registering with the openings in the opposite first mentioned plate, said openings being adapted to receive fastening means for the ends of the braces, and fastening means arranged between said plates to retain said second mentioned plates in said recesses.

4. A fitting for diagonal bracing members comprising a pair of plates adapted to be arranged on opposite sides of the ends of the bracing members, said plates being provided with recesses and being further provided with openings, a second pair of plates mounted in said recesses and provided with openings registering with the openings in the opposite first mentioned plate, securing means for the ends of the braces mounted in said registering openings, and a tensioning bolt arranged between said plates and adapted to retain said second mentioned plates in said recesses.

In testimony whereof we affix our signatures in presence of two witnesses.

RICHARD RALPH BLOSS.
WILLIAM SCHWEMLEIN.

Witnesses:
HERBERT L. POSTLEWAIT,
LEROY E. WEBER.